(12) United States Patent
Moniot

(10) Patent No.: US 6,850,527 B1
(45) Date of Patent: Feb. 1, 2005

(54) DEVICE FOR ASSOCIATING INDEXES TO ADDRESSES CHOSEN FROM A GREATER NUMBER THAN THE NUMBER OF AVAILABLE INDEXES

(75) Inventor: Pascal Moniot, Bernin (FR)

(73) Assignee: STMicroelectronics S.A., Montrouge (FR)

( * ) Notice: Subject to any disclaimer, the term of this patent is extended or adjusted under 35 U.S.C. 154(b) by 0 days.

(21) Appl. No.: 09/523,572

(22) Filed: Mar. 10, 2000

(30) Foreign Application Priority Data

Mar. 12, 1999 (FR) .............................................. 99 03261

(51) Int. Cl.⁷ .............................. H04L 12/28; H04J 3/07
(52) U.S. Cl. .................. 370/399; 370/389; 370/395.31; 370/395.51; 370/505
(58) Field of Search ............................... 370/399, 395.1, 370/395.31, 505, 389, 400, 412, 413, 506, 395.32, 397, 409, 521

(56) References Cited

U.S. PATENT DOCUMENTS

| 5,414,701 A | * | 5/1995 | Shtayer et al. ............ 370/395.3 |
| 5,479,401 A | * | 12/1995 | Bitz et al. ................... 370/397 |
| 5,481,687 A | * | 1/1996 | Goubert et al. ............. 711/212 |
| 5,555,256 A | * | 9/1996 | Calamvokis ................. 370/399 |
| 5,936,959 A | * | 8/1999 | Joffe ........................... 370/397 |
| 6,034,958 A | * | 3/2000 | Wicklund ............... 370/395.32 |
| 6,262,985 B1 | * | 7/2001 | Huang et al. ................ 370/397 |
| 6,289,014 B1 | * | 9/2001 | Hoshino et al. ............ 370/392 |
| 6,335,932 B2 | * | 1/2002 | Kadambi et al. ........... 370/391 |

FOREIGN PATENT DOCUMENTS

EP  0 600 683  6/1994

* cited by examiner

Primary Examiner—Hanh Nguyen
(74) Attorney, Agent, or Firm—Lisa K. Jorgenson; E. Russell Tarleton; Seed IP Law Group PLLC

(57) ABSTRACT

A device for associating indexes to addresses chosen from among a greater number of values than the number of available indexes, including a memory containing indexes and respective check words corresponding to predetermined bits of the addresses associated with the indexes; a packing circuit receiving a current address and suppressing in this address bits determined by a pattern such that the suppressed bits correspond to bits of the check words, the packed address provided by the packing circuit being used to select in the read mode a memory location; and a comparator indicating that the current address corresponds to the selected memory location if the bits of the check word of the selected location are equal to the corresponding bits of the current address.

21 Claims, 1 Drawing Sheet

US 6,850,527 B1

DEVICE FOR ASSOCIATING INDEXES TO ADDRESSES CHOSEN FROM A GREATER NUMBER THAN THE NUMBER OF AVAILABLE INDEXES

TECHNICAL FIELD

The present invention relates to a multiprotocol interface enabling establishment of several connections between one or several ATM networks and networks of a different nature, such as Ethernet networks. The present invention more specifically relates to a device for sorting ATM addresses (called VP/VC addresses) intended for identifying if a VP/VC address contained in a packet arriving on the ATM network is directed to the interface, that is, if the VP/VC address corresponds to a connection that has been opened in the interface.

BACKGROUND OF THE INVENTION

FIG. 1 schematically illustrates a multiprotocol interface 10 used to connect several Ethernet networks 12 to several ATM networks 14. The connection between interface 10 and the several ATM networks 14 is generally performed via a multiplexer-demultiplexer 16 connected by a single series link L (generally, UTOPIA 2) to interface 10.

Each data packet or cell transmitted over an ATM network contains a VP/VC address identifying the addressee of the packet. Given that packets coming from several ATM networks are multiplexed on single link L connecting circuit 16 to interface 10, the physical link to which the packets correspond must be identified. For this purpose, interface 10 adds to the VP/VC addresses of the packets transmitted over link L additional bits that enable identification of the physical link.

FIG. 2 symbolizes such an address A of a packet transmitted over link L. This address contains a 16-bit VC field (virtual connection) followed by a first 8-bit VP field (virtual path) and by a second 4-bit VP field. The three fields form the normal VP/VC addresses. A field P of enough bits to identify all the physical links to the ATM networks is added to these fields. For example, field P contains 4 bits enabling identification of 16 different links.

An ATM link can be of UNI type (User Network Interface) for which the number of connections is limited to $2^{24}$. Accordingly, the addresses used on a UNI network are 24-bit addresses and use the VC field and the first 8-bit VP field of FIG. 2. An ATM network can also be of NNI type (Network-Network Interface). In this case, the number of possible connections is multiplied by 16 with respect to a UNI network. Accordingly, the VP/VC addresses used over such a link exploit the two VP fields of FIG. 2 and enable identifying up to $2^{28}$ connections.

Further, multiprotocol interface 10 is provided to manage a number of connections much smaller than the number of possible connections over an ATM network. For example, it can be provided to manage $2^{10}=1024$ connections. A problem that is raised in such an interface is to associate, with each of the connections opened in the interface, incoming ATM packets directed thereto. Indeed, an address A (that is, a VP/VC address increased by the bits P necessary to identify the physical link) may have any one of $2^{32}$ values (in the above-mentioned example with 16 physical links), while the number of active connections is at most equal to 1024 in the example. Thus, a solution must be found to associate 1024 addresses chosen from among $2^{32}$ with 1024 active connections in the interface.

A first immediate solution consists of using a table with 1024 inputs corresponding to the possible connections in the interface and writing into this table the addresses A associated with the active addresses. Then, when a packet is received, the address A is extracted therefrom and the table is browsed until it is found. If address A is not found in the table, the corresponding packet is not directed to the interface and it is ignored.

This solution requires browsing an average 512 locations in the table for each packet directed to the interface. If a packet is not directed to the interface, the 1024 locations are systematically browsed for nothing. Thus, this solution is too costly in terms of calculation time.

Another solution consists of using an associative memory having 1024 locations into which the addresses A associated with the active interface connections are written. Upon reception of a packet, its address A is extracted and compared in parallel with all the inputs of the table, which table then provides a 10-bit index associated with the address, if this address is present in the table. This solution is however too costly in terms of equipment (it requires 1024 32-bit comparators and 1024 42-bit registers).

SUMMARY OF THE INVENTION

The present invention provides an address association device that is particularly efficient in terms of rapidity and material cost.

Moreover, an embodiment of the present invention provides a device for associating indexes to addresses chosen from among a greater number of values than the number of available indexes, including a memory containing indexes and respective check words corresponding to predetermined bits of the addresses associated with the indexes; a packing circuit receiving a current address and suppressing in this address bits determined by a pattern such that the suppressed bits correspond to bits of the check words, the packed address provided by the packing circuit being used to select in the read mode a memory location; and a comparator indicating that the current address corresponds to the selected memory location if the bits of the check word of the selected location are equal to the corresponding bits of the current address.

According to an embodiment of the present invention, the device includes a mask circuit which, according a predetermined mask, annuls bits other than those suppressed by the packing circuit, which also correspond to check word bits.

According to an embodiment of the present invention, the memory locations contain, each, an enable bit indicating whether the location is occupied or not.

According to an embodiment of the present invention, the addresses are ATM network addresses, the indexes identifying connections of the device to one or several ATM networks.

According to an embodiment of the present invention, the addresses provided by the packing circuit have a 16-bit size, the indexes have a 10-bit size, and the check words correspond to the 20 most significant bits of the ATM addresses.

According to an embodiment of the present invention, the device is provided to be connected to 16 ATM networks, the addresses provided to the device having 4 most significant bits enabling identification of the corresponding ATM networks.

The foregoing features and advantages of the present invention will be discussed in detail in the following non-limiting description of specific embodiments in connection with the accompanying drawings.

DETAILED DESCRIPTION OF THE INVENTION

An address association device according to the present invention uses a negotiation that conventionally occurs between the interface and an ATM network in a set phase. This negotiation is performed on three special connections that are permanently active, called signaling, meta signaling and multidiffusion. The addresses of these connections are predefined and are identical, whatever the type of network.

During the negotiation, which is performed at each connection opening by using the signaling connection, the ATM network provides VP/VC addressees to the interface. According to these addresses, the interface determines a calculation rule for the addresses that it will effectively use for the connections that will be created. The interface accepts a VP/VC address only if does not collide with the address of an active connection in the interface. In case of a collision, the interface refuses the address and the network provides another one.

The calculation rule established by the interface consists of setting predetermined bits of the VP/VC addresses that will be usable by the interface to identify its connections. As a general rule, these specific bits are the eight least significant bits of the VP/VC addresses and four other arbitrary bits. Further, as previously indicated, the interface must be able to manage connections to several ATM networks, for example, 16, on which same VP/VC addresses can be used. The VP/VC addresses of the different networks are differentiated by the numbers of the corresponding physical links, coded over four bits in the example.

Accordingly, the interface has 16 bits out of 32 to identify its connections. Given that the interface, in the example, manages at most $2^{10}=1024$ connections, the above-mentioned 16 bits are sufficient to identify all these connections.

Figure 1:
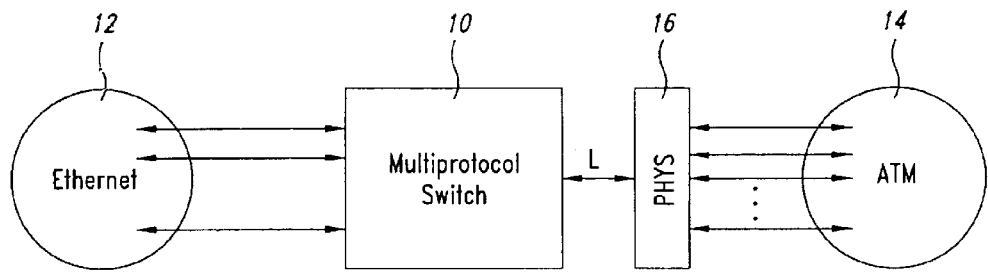
FIG. 1, previously described, schematically shows a multiprotocol interface connected between ATM networks and Ethernet networks FIG. 2, previously described, shows the structure of an ATM address, which has been increased by a physical link identification address.
Figure 2:
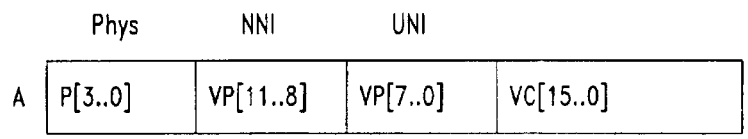
Figure 3:
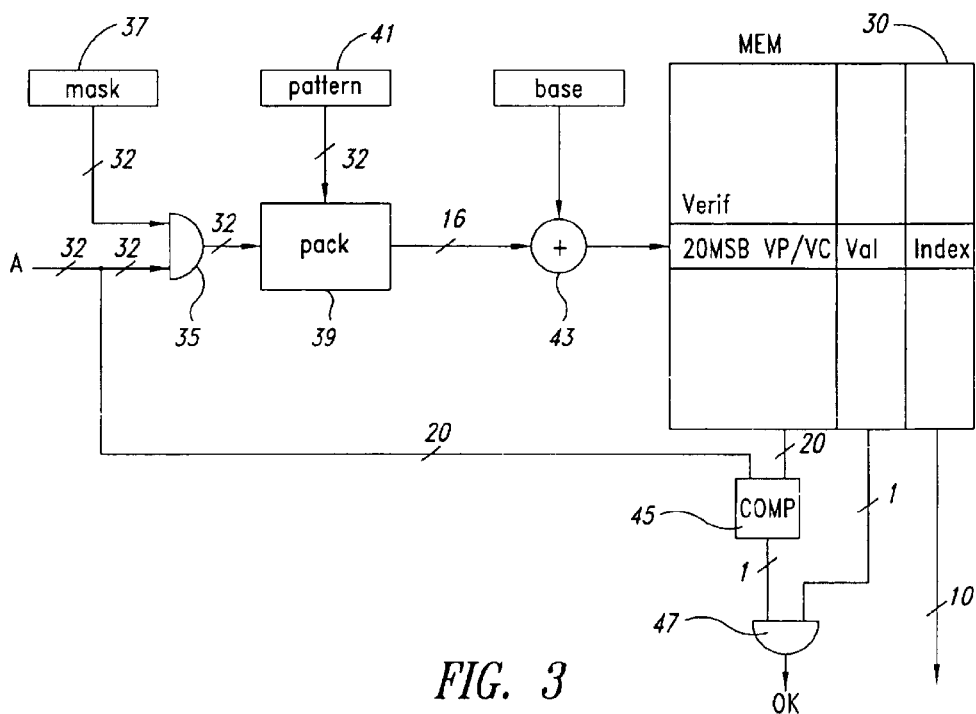
FIG. 3 schematically shows an embodiment of an address association device according to the present invention.

FIG. 3 schematically shows an embodiment of a device according to the present invention for identifying whether 32-bit address A corresponds to an active connection identified by a 10-bit index.

The device includes a memory area 30 that advantageously is a resource shared by different active processes in the interface. It is, for example, a SDRAM-type memory organized in 32-bit words.

Memory area 30 includes $2^{16}$ consecutive 32-bit words. Each of these words is likely to be associated with an active connection. Given that the maximum number of connections is 1024, at most 1024 locations from among $2^{16}$ will be used in memory area 30. The inoccupation rate is actually not very disturbing, since a standard memory having a particularly low cost per bit may be used.

Each word of area 30 is likely to contain a 10-bit index of identification of a connection, an enable bit indicating whether the location is used or not by a connection, and finally a check word of 20 bits that, in the present example, are the 20 most significant bits of the VP/VC address of the connection associated with the location. The locations are selected in the write mode or in the read mode in a specific way described hereafter.

An address A presented to the device, of 32 bits in the example, undergoes a masking at 35. The masking consists of performing a bit-to-bit AND operation with a mask stored in a register 37. The masked address, of 32 bits, undergoes a packing at 39 according to a pattern stored in a register 41. The packing consists of bringing the address size down to 16 bits by suppressing bits indicated by pattern 41. To the 16-bit address thus generated is added a base address at 43 to select a location in memory area 30, the base address being the address of the first location of area 30.

There are as many registers 37 and 41 as there are physical links, 16 lines in the example.

As indicated previously, at the end of the negotiation performed with the ATM networks at the starting of the interface, the latter establishes a calculation rule determining that predetermined bits are used to differentiate the possible connections in the interface, the remaining bits being arbitrary. The function of packing circuit 39 is to only keep in addresses A the bits used to differentiate the connections in the interface.

Generally, pattern 41 is fixed during all the interface operation. It may however, in some cases, be modified in operation. Then, all the ongoing connections are closed, since they could no longer be identified.

The masking performed at 35 is only used in some cases in which the number of bits that the interface can use to identify the connections is smaller than the number of bits remaining after the packing. In such a situation, mask 37 is chosen to annul bits in address A that will not be suppressed by the packing.

Upon creation of a new connection by the interface, the involved ATM network assigns a VP/VC address to the connection, this VP/VC address being increased by the 4 identification bits of the ATM network to form address A. Address A is applied to the device of FIG. 3 while memory 30 is selected in the write mode. The packed address finally provided to memory 30 selects a location into which the index of the new connection, an enable bit at 1, and a check word, the function of which will be understood hereafter; are written.

Now, each time the same address A is presented to the device, this address selects the same location of memory area 30. However, there is a family of addresses A that all select the same location. Indeed, this will occur for all addresses A having equal bits kept by packing circuit 39 and which only differ by the suppressed bits, given that these addresses will all provide the same packed address. The check word written in the locations of memory area 30 is used to avoid this ambiguity.

Generally, the check word contains, among the bits of the address assigned to the connection, all the bits that are suppressed by packing 39 and annulled by masking 35. Only considering the packing, this check word theoretically contains 16 bits in the chosen example.

Thus, as shown, from address A presented to the device are derived the bits that will be suppressed by the packing, which bits are compared at 45 to the bits of the check word read from the selected location. In the case of an equality, address A corresponds to the connection of the selected location and the index stored in the location identifies the connection.

Of course, the location has to correspond to an active connection, which is indicated by the enable bit. Thus, finally, an AND gate 47 receiving the output of comparator 45 and the enable bit indicates whether address A effectively corresponds to an active connection in the interface.

In practice, to simplify the device structure, the check words stored in memory area 30 are the 20 most significant bits of the assigned VP/VC addresses. This choice requires that the 8 least significant bits of the VP/VC addresses are never suppressed or masked. Now, this is generally the case. The 4 remaining bits that are not suppressed or masked are arbitrary bits among the 20 most significant bits.

The bits enabling identification of the physical links to ATM networks are not suppressed by the packing circuit.

It should be noted that the locations of memory area 30 are generally of thirty-two bits, which is enough to store a 10-bit index, an enable bit, and the 20 bits of the check words.

Upon closing of a connection, the interface annuls the enable bit in the corresponding location of memory area 30.

Of course, the present invention is likely to have various alterations, modifications, and improvements which will readily occur to those skilled in the art. Such alterations, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A device for associating indexes to addresses chosen from among a greater number of values than the number of available indexes, including:
    a memory having a plurality of memory locations, each memory location containing at least one index and one respective check word, the check word of each index being equal to a first set of bits having first predetermined positions in the address that is to be associated with said indexes;
    a packing circuit for receiving a current address and for providing a packed address equal to a second set of bits having second predetermined positions in the current address, said first and second predetermined positions being distinct, said packed address used to select in a read mode a memory location; and
    a comparator for comparing the check word of said selected memory location to a third set of bits having said first predetermined positions in the current address, and for indicating that the current address corresponds to the selected memory location when the check word of the selected location is equal to the third set of bits.

2. The device of claim 1, wherein the device includes a mask circuit that, according a predetermined mask, annuls bits other than those suppressed by the packing circuit, which also correspond to check word bits.

3. The device of claim 1, wherein each memory location contains an enable bit indicating whether the location is occupied or not.

4. The device of claim 1, wherein the addresses are ATM network addresses, and the indexes identify connections of the device to one or several ATM networks.

5. The device of claim 4, wherein the addresses provided by the packing circuit have a 16-bit size, the indexes have a 10-bit size, and the check words correspond to the twenty most significant bits of the ATM addresses.

6. The device of claim 5, further comprising an input configured to be connected to sixteen ATM networks, the addresses provided to the device having four most significant bits enabling identification of the corresponding ATM networks.

7. An address association device, comprising:
    a masking circuit configured to receive a plurality of address bits and mask the address bits in accordance with a predetermined mask pattern;
    a packing circuit configured to receive address bits from the masking circuit and to reduce the number of address bits to a plurality of index bits and to suppress from the address bits a plurality of check word bits having first predetermined positions in the address bits according to a predetermined packing pattern;
    a memory configured to receive the plurality of index bits and the plurality of check word bits and to associate the received index bits and check word bits with a memory location of a network connection, the memory location containing at least one index and one respective check word, the respective check word of each index being equal to a first set of bits having the first predetermined positions, the packed address equal to a second set of bits having second predetermined positions in the address bits, the first and second predetermined positions being distinct; and
    a comparator coupled to the memory and configured to receive the plurality of address bits and to compare the check word of the selected memory location to a third set of bits having the first predetermined positions, and to indicate when selected bits from the plurality of address bits correspond to the plurality of check word bits associated with the memory location addressed in the plurality of address bits.

8. The device of claim 7 wherein the masking circuit is configured by the predetermined mask pattern to mask bits not suppressed by the packing circuit when the number of bits used to address a network connection in memory is fewer than the number of bits remaining after the plurality of address bits are reduced by the packing circuit.

9. The device of claim 7 wherein each network connection in memory includes an enable bit that is configured to signal when the network connection in memory is an active connection to the network.

10. The device of claim 9, further comprising a logic circuit coupled to the enable bit and to the comparator and configured to indicate when a selected location addressed by the plurality of address bits is an active location.

11. The circuit of claim 7, further comprising a register configured to store a base address corresponding to a beginning address in memory and, further comprising an adder for adding the base address to the address bits received from the packing circuit.

12. A method for associating an address to a memory location, comprising:
    receiving a plurality of address bits and masking the address bits in accordance with a predetermined mask pattern;
    packing the masked plurality of address bits to reduce the number of address bits to a plurality of packed address bits according to a predetermined packing pattern and suppressing check word bits from the masked address bits, the check word bits having first predetermined positions in the plurality of address bits, the memory location containing at least one index and one respective check word, the respective check word of each index being equal to a first set of bits having the first predetermined positions, the packed address equal to a second set of bits having second predetermined positions in the address bits, the first and second predetermined positions being distinct;

associating the packed bits with a memory location corresponding to a network connection; and comparing the check word of the selected memory location to a third set of bits having the first predetermined positions, and indicating when there is a match.

13. The method of claim 12 wherein masking comprises configuring the predetermined masking pattern to mask bits not suppressed by packing when the number of bits used to address a selected memory location is fewer than the bits remaining after packing.

14. The method of claim 12, further comprising ANDing an enable bit with the results of the comparing to determine if a selected memory location is an active connection.

15. The method of claim 14, further comprising disabling an enable bit corresponding to a memory location selected by the plurality of address bits when the memory location is occupied.

16. The method of claim 15 wherein masking comprises configuring the predetermined mask pattern to mask bits not suppressed by packing when the number of bits used to address a selected memory location is fewer than the bits remaining after packing, and further comprising configuring the predetermined mask pattern to mask bits to prevent accessing selected memory locations that have been previously addressed.

17. The method of claim 12 wherein packing comprises storing a base address corresponding to a beginning address in memory and the method further comprises adding the base address to the packed address bits reduced during packing.

18. A device for associating indexes to addresses chosen from among a greater number of values than the number of available indexes, including:

a memory containing indexes and respective check words corresponding to predetermined bits of the addresses associated with the indexes;

a packing circuit receiving a current address and suppressing bits in the current address in accordance with a pattern such that the suppressed bits correspond to bits of the check words and the bits not suppressed from a packed address, the packed address used to select in a read mode a memory location, the packed address provided by the packing circuit having a 16 bit size, the indexes having a 10-bit size, and the check words correspond to the twenty most significant bits of the ATM addresses; and a comparator configured to indicate that the current address corresponds to the selected memory location when the bits of the check word of the selected location are equal to the corresponding bits of the current address.

19. A device for associating indexes to addresses chosen from among a greater number of values than the number of available indexes, including:

a memory containing indexes and respective check words corresponding to predetermined bits of the addresses associated with the indexes;

a packing circuit receiving a current address and suppressing bits in the current address in accordance with a pattern such that the suppressed bits correspond to bits of the check words and the bits not suppressed from a packed address, the packed address used to select in a read mode a memory location, the packed address provided by the packing circuit having a 16 bit size, the indexes having a 10-bit size, and the check words correspond to the twenty most significant bits of the ATM addresses;

a comparator configured to indicate that the current address corresponds to the selected memory location when the bits of the check word of the selected location are equal to the corresponding bits of the current address; and an input configured to be connected to sixteen ATM networks, the addresses provided to the device having four most significant bits enabling identification of the corresponding ATM networks.

20. An address association device, comprising:

a masking circuit configured to receive a plurality of address bits and mask the address bits in accordance with a predetermined mask pattern;

a packing circuit configured to receive address bits from the masking circuit and to reduce the number of address bits to a plurality of index bits and to suppress a plurality of check word bits from the address according to a predetermined packing pattern;

a memory configured to receive the plurality of index bits and the plurality of check word bits and to associate the received index bits and check word bits with the memory location of a network connection; and a comparator coupled to the memory and configured to receive the plurality of address bits and to indicate when selected bits from the plurality of address bits correspond to the plurality of check word bits associated with the memory location addressed in the plurality of address bits;

wherein the masking circuit is configured by the predetermined mask pattern to mask bits not suppressed by the packing circuit when the number of bits used to address a network connection in memory is fewer than the number of bits remaining after the plurality of address bits are reduced by the packing circuit.

21. A method for associating addresses to memory locations, comprising:

receiving a plurality of address bits and masking the address bits in accordance with a predetermined mask pattern;

packing the masked plurality of address bits to reduce the number of address bits to a plurality of packed address bits according to a predetermined packing pattern and suppressing check word bits from the masked address bits;

associating the packed bits with a memory location corresponding to a network connection; and comparing selected bits from the plurality of address bits for a selected memory location with selected bits associated with a memory location addressed in the plurality of address bits and indicating when there is a match; wherein masking comprises configuring the predetermined masking pattern to mask bits not suppressed by packing when the number of bits used to address a selected memory location is fewer than the bits remaining after packing.

* * * * *